United States Patent [19]

Cerutti et al.

[11] 4,092,140
[45] May 30, 1978

[54] APPARATUS AND METHOD USING HEAT PIPES FOR MANIPULATING TEMPERATURE GRADIENTS IN A GLASS FORMING CHAMBER

[75] Inventors: Richard L. Cerutti, Seminole; Vincent I. Henry, New Kensington; John E. Sensi, Arnold, all of Pa.

[73] Assignee: PPG Industries, Inc., Pittsburgh, Pa.

[21] Appl. No.: 721,243

[22] Filed: Sept. 8, 1976

[51] Int. Cl.$^2$ .................................................. C03B 18/02
[52] U.S. Cl. ................................. 65/99 A; 65/182 R; 65/356; 165/105
[58] Field of Search .................. 65/182 R, 65 A, 337, 65/99 A, 335, 346, 134, 356; 165/105

[56] References Cited

U.S. PATENT DOCUMENTS

| | | | |
|---|---|---|---|
| 3,420,647 | 1/1969 | Charnock | 65/65 A |
| 3,607,209 | 9/1971 | Lazaridis | 65/337 |
| 3,640,517 | 2/1972 | Sendt | 65/346 |
| 3,644,110 | 2/1972 | Sendt | 65/137 |
| 3,761,220 | 9/1973 | Dirne | 65/356 |
| 3,798,017 | 3/1974 | Classen | 65/99 A |
| 3,843,346 | 10/1974 | Edge et al. | 65/65 A |
| 3,884,292 | 5/1975 | Pessolana et al. | 165/105 |
| 3,930,828 | 1/1976 | Kunkle | 65/65 A |
| 3,930,829 | 1/1976 | Sensi | 65/65 A |
| 3,954,432 | 5/1976 | Hummel et al. | 65/65 A |
| 3,985,182 | 10/1976 | Hara et al. | 165/105 |

OTHER PUBLICATIONS

"Cooling with Heat Pipes", Francis J. Lavoie, *Machine Design*, Aug. 6, 1970.

*Primary Examiner*—Arthur D. Kellogg
*Attorney, Agent, or Firm*—E. Kears Pollock

[57] ABSTRACT

A plurality of high-temperature operating, corrosion-resistant heat pipes are employed to distribute heat transversely and longitudinally from normally hotter portions of a glass forming chamber to normally cooler portions of the same chamber in order to provide a more uniform thermal environment for the forming of flat glass. In particular, heat pipes are provided beneath the surface of a pool of glass-supporting molten metal in such a chamber to remove heat from a central and usually upstream region of such a chamber and transfer it to a marginal and preferably downstream region of the chamber. By transferring the heat in this manner, the temperature gradients within the chamber may be manipulated to be more uniform throughout a forming region so that glass of improved quality can be produced with improved efficiency, utilizing less energy than normally required for producing glass according to typical conventional float glass manufacturing methods.

37 Claims, 12 Drawing Figures

APPARATUS AND METHOD USING HEAT PIPES FOR MANIPULATING TEMPERATURE GRADIENTS IN A GLASS FORMING CHAMBER

BACKGROUND OF THE INVENTION

1. Field of the Invention

This invention relates to the manufacture of flat glass and in particular relates to the making of flat glass by a method wherein the glass is floated on or supported by a pool of molten metal during its formation into a continuous sheet or ribbon of glass. In particular, this invention relates to that special area of interest of the manufacture of glass involving heating or cooling the glass to provide desired thermal conditions for forming glass of good optical flatness for a variety of end uses.

2. Description of the Prior Art

It has been known at least from the early nineteen hundreds that flat glass could be produced by floating a body or layer of glass on a pool of molten metal while cooling the glass and drawing it onto the surface of the molten metal to form a continuous ribbon or sheet of glass having desired thickness and width. More recently, such processes have become commercial reality such that most flat glass produced in the U.S. today is made by techniques involving flotation of glass.

At the time of the earliest patents relating to the manufacture of flat glass by a float method, there was already an appreciation of the need for a controlled thermal environment in which the molten glass could be formed into a dimensionally stable sheet or ribbon of glass. This is particularly evident in U.S. Pat. No. 789,911 to Hitchcock which teaches that a supporting pool or bath of molten metal may be subdivided into a plurality of adjacent smaller pools of molten metal, each in communication with those adjacent to it and each at slightly different temperature from those adjacent to it so that a longitudinal temperature gradient along the path of glass movement through the forming chamber can be maintained with the temperatures gradually dropping as glass is advanced through the chamber until the glass would be sufficiently chilled to have surfaces not readily susceptible to marking or damage prior to being removed from support by molten metal.

Since the time of the Hitchcock reference, there has been an appreciation that transverse temperature gradients, that is, temperature gradients normal to the path of glass advance through a forming chamber, may also be controlled to achieve any of a number of desired results. U.S. Pat. No. 3,843,346 to Edge and Kunkle describes in detail the desirability of maintaining rates of cooling in the initial portion of a glass forming chamber such that the central portion of an advancing layer of glass is caused to cool relatively more rapidly than the marginal portions of the advancing layer of glass caused to cool relatively more slowly than would naturally occur in a forming chamber not having particular facility for achieving such results. A conventional process simply providing for the natural cooling of margins at a greater rate than a thermally protected interior or central portion of an advancing layer of molten glass would be more susceptible to the development of optical distortion in its finished glass than a process like that of Edge and Kunkle.

U.S. Pat. No. 3,930,829 to Sensi, one of the instant applicants, discloses that dams or barriers submerged in a pool of molten metal upon which glass is to be formed may be positioned in paired angular relation to one another. The dam barriers are so arranged as to provide communication between molten metal at a central, upstream location in a pool of molten metal and a marginal, downstream location in the pool so that thermally-induced natural convection in the pool of molten metal between such dams or barriers causes heat to be transferred from the central, upstream location to the marginal, downstream location with a consequent redistribution of heat and temperature in the chamber.

Since the present invention contemplates the use of heat pipes within a glass forming chamber, it is useful to consider what a heat pipe is and how a heat pipe works, as well as some prior art references concerning the use of heat pipes and conditions under which heat pipes may be employed in industrial processes. Heat pipes are described in detail in an article entitled "Cooling With Heat Pipes" by Francis J. Lavoie in *Machine Design*, issue date Aug. 6, 1970. Briefly, a heat pipe is an enclosed container having a working fluid inside it, with the working fluid being selected so as to vaporize in one portion of the container with the vapors expanding and flowing to another location in the chamber where they are condensed with the condensed working fluid returning by means of capillary action or centrifugal force or some other transfer mechanism not involving pumping back to the location at which the vaporization takes place. A heat pipe therefore has many characteristics similar to that of an absorption refrigeration unit and is a device effective for receiving heat from its surroundings at the location where vaporization takes place in giving up heat to its surroundings at the location where condensation takes place.

Heat pipes have been employed in glassmaking furnaces as evidenced by U.S. Pat. No. 3,640,517 to Sendt and in conjunction to glass molds as shown in U.S. Pat. No. 3,644,110 to Sendt and U.S. Pat. No. 3,761,220 to Dirne. U.S. Pat. No. 3,607,209 to Lazaridis shows heat pipe extending into a pool of molten glass in a glassmaking furnace for the purpose of supplying heat to the glassmaking furnace.

While there have been numerous proposals and practices relating to control of heating and cooling in the glass forming chamber, there has not been provision made in conventional glass forming chambers for either redistributing the heat in the chamber without removing heat therefrom and allowing it to be wasted or without adding a net amount of heat thereto requiring the consumption of additional energy. It is therefore a purpose of the present invention to accomplish such a beneficial redistribution of heat within a glass forming chamber without consequent energy losses incidental to such redistribution of heat or with only such ancillary removal of heat as is necessary to ultimately cool the whole body of advancing glass in a glass forming chamber to provide the glass at a satisfactory temperature for removal from the forming chamber itself.

SUMMARY OF THE INVENTION

A flat glass forming chamber comprising an enclosure having a refractory liner containing a pool of molten metal, such as molten tin or an alloy of tin, for supporting glass during forming and having a facility for delivering a continuous stream or layer of molten glass onto the pool of molten metal and a facility for advancing the glass along the surface of the pool of molten metal to an exit location and having a glass sheet removal facility and conveyer associated with it is modified by the inclusion of heat pipes wholly or partially within the chamber in order to redistribute heat and maintain particularly desired temperature gradients within the chamber during the forming of glass.

A heat pipe is positioned at least partially transversely across the forming chamber for balancing temperatures along the length of the heat pipe in order that temperatures within the chamber should be adjusted and maintained substantially uniformly along a substantially transverse dimension of the forming chamber corresponding to the transverse region of the chamber over which the heat pipe extends. A single heat pipe having a substantially linear configuration may be disposed partially or entirely across the forming chamber either in a headspace above the pool of molten metal and above where the glass is to be advanced through the chamber or submerged in or beneath the pool of molten metal in the chamber. The heat pipe may be wholly within the enclosure of the forming chamber or may extend outwardly through a casing confining the enclosure, particularly at the sides of the enclosure. If the heat pipe extends out through one or both sides of the enclosure, the exposed end of the heat pipe, that is the end outside the enclosure, may be heated or cooled as desired to supplement the heat redistribution function of the heat pipe.

In a preferred embodiment of the invention, the exposed end of the heat pipe is provided with cooling in order to effect a net removal of heat from the forming chamber. This assists in the cooling of glass advancing past the heat pipe and shortens the period of advance for cooling the glass sufficiently to render it dimensionally stable and suitable for removal from the forming chamber. Such an embodiment of the invention provides for shortening a forming chamber substantially from the length found for commercial forming chambers, which is on the order of 200 feet long. A forming chamber embodying this invention may be constructed with less capital resources than an ordinary forming chamber and may employ a bath or pool of molten metal, such as tin, containing substantially less metal than in an ordinary chamber, which in itself may be costly and scarce. Thus, there are great economic benefits to be achieved with such an embodiment of the invention.

As already mentioned, the heat pipes located in a forming chamber may be submerged in a pool of molten metal in the chamber or located beneath a pool of molten metal in the chamber, in which instance heat pipes would preferably be embedded within the refractory liner in the bottom of the forming chamber.

The outer shell should be tungsten-molybdenum alloy or rhenium or refractory clad. Cladding could be placed over stainless steel (310) or nickel steel shells. The cladding may be fiberous glass, silica, alumina or the like. The cladding may be applied by flame spray techniques or the like.

The wicks of the heat pipes may be machined, etched or sintered into the interior of the shell. Conventional heat pipe wicks may generally be employed so long as they can withstand the temperatures encountered during use.

Typical working fluids suited for use in the heat pipes would be organic heat exchange fluids (halogenated hydrocarbons and the like) or liquid metals, such as potassium or sodium. Organic working fluids may be used in heat pipes which are used at locations where the external temperatures are below about 1150° F. The liquid metals may be employed at the higher temperatures. At temperatures of up to about 2100° F. the liquid metal working fluids may be used in heat pipes having stainless steel shells. At these higher temperatures such heat pipes can be used at locations close to where molten glass is delivered to the forming chamber.

In a preferred embodiment of the invention, a pair of heat pipes are positioned in complementary relation and disposed to each side of the forming chamber, rather than providing a single heat pipe extending transversely across the central and both marginal portions of the forming chamber. Each of a pair of complementary heat pipes may be located in the forming chamber without extending across the longitudinal centerline of the forming chamber. If it is desired to avoid the existence of a center region having no heat pipe extending across it in order to ensure the avoidance of a hot spot in an extremely confined central region of the chamber, it is possible to provide complementary paired heat pipes with each skewed and lapped past the other and extending across the longitudinal centerline of the forming chamber a short distance.

In one preferred embodiment of this invention, one or more heat pipes are positioned in the forming chamber in the vicinity of the exit end of the forming chamber in order to provide for uniformly distributing heat throughout the full width of a dimensionally stable, continuous sheet or ribbon of glass immediately before lifting the glass from the surface of the supporting pool of molten metal and conveying it therefrom out of the forming chamber. In the past, glass forming operations have from time to time been plagued with the problem of having a continuous sheet or ribbon of glass break as an attempt is made to lift it continuously from the surface of its supporting pool of molten metal. Problems have been encountered both in systems wherein glass is lifted vertically and those wherein glass is lifted only slightly and then conveyed horizontally from a forming chamber. Such so-called exit-end breaks are, in part, believed to be caused by a nonuniformity of glass temperature coupled with attempts to make the temperature uniform by cooling the glass. But glass cooling, if not controlled with great care, may be so great as to make the glass unnecessarily brittle at the time of lifting. By providing one or more heat pipes extending at least partially transversely across the forming chamber in the vicinity of its exit end, it is possible to cool or heat the glass adequately throughout its full width immediately prior to lifting so that its temperature at the time of lifting may be carefully and precisely controlled within relatively narrow range of temperatures at which the glass has the right degree of elasticity to permit it to be lifted without any substantial danger of causing breaking or warping.

In another preferred embodiment of this invention, one or more heat pipes are positioned in the forming chamber in the vicinity of the entrance end of a forming chamber where molten glass is delivered as a layer or stream onto the pool of supporting molten metal contained in the forming chamber. A prime purpose of heat pipes located in this position is to prevent the undesirable rapid cooling of the marginal edge portions of the advancing stream or layer of molten glass during its initial stages of formation. This is done to prevent the development of extremely sharp velocity profiles across the width of the glass wherein the glass in the marginal edge portions of the advancing stream is advancing at speeds of less than one-fourth or one-fifth of the speed of the advance of the glass in the central portion of the advancing layer of molten glass. As taught in the above-referenced patent of Edge and Kunkle, the surface distortion quality of a continuous sheet of glass may be substantially improved by avoiding such sharp differences in the speed of advance of the glass immediately following its delivery onto a supporting pool of molten metal for forming. Heat pipes appear to be ideally suited for controlling the transverse distribution of heat throughout an advancing layer of molten glass in a forming chamber. Thus, while it is already known to be desirable to accomplish a redistribution of heat within the entrance region of a forming chamber, the use of heat pipes for such purpose is believed to be substantially superior to the use of overhead electric heaters and combination of heaters and coolers which are controlled for the purpose of heating and cooling selected portions of an advancing layer of glass. The use of heat pipes for the purpose of redistributing heat in this part of a forming chamber provides a self-regulating mechanism by which the temperature of the glass at any location throughout the width of the advancing layer may be maintained in balance with temperature of glass at locations elsewhere in the advancing layer of glass without the necessity of providing sophisticated or elaborate temperature detection measurement and controlled heating and cooling. This invention permits a virtually instantaneous response to random variations in temperature which may occur in a stream of molten glass being discharged from a glass melting and refining furnace to a forming chamber provided with heat pipes in the vicinity of its entrance end.

Heat pipes having a substantially linear configuration may be positioned in a forming chamber in pairs having a substantially V configuration due to the position of each heat pipe of each pair. By arranging heat pipes in this manner with the apex of each V pointing in an upstream direction of the glass forming chamber, that is, pointing toward the entrance end of the forming chamber, it is possible to provide for transferring heat simultaneously laterally and longitudinally through a portion of the chamber. With such an arrangement it is possible to have a first end of each of such heat pipes at a location in the forming chamber that is both upstream and centrally disposed of the other second end of the heat pipe which is downstream and marginally disposed from the first end. Since an advancing layer or sheet of glass passing over such a heat pipe first passes over the centrally disposed, upstream end of the heat pipe and then over the downstream, marginally disposed end of the heat pipe, the heat pipe is effective for transferring heat from a central portion of an advancing layer or sheet of glass to a marginal portion of the sheet which has already had a longer residence time within the forming chamber. In the absence of any controlled redistribution of heat within the chamber the marginal portion of the glass would naturally tend to be colder than the central portion of the glass after the same residence time in the forming chamber and even colder after a longer residence time in the forming chamber. Therefore, this V arrangement of heat pipes within the forming chamber is effective to transfer heat from a central portion of an advancing layer or sheet of glass to a marginal portion of an advancing layer or sheet of glass and because of the orientation to operate between locations that would normally have substantially different temperatures. Such an arrangement substantially improves the heat transfer efficiency of the heat pipes since the heat transfer efficiency of the heat pipes is dependent upon the imposed temperature difference over which they are operating and attempting, by their internal vaporization, condensation and transfer of working fluid, to make uniform.

In a particularly preferred embodiment of this invention involving the arrangement of a pair of heat pipes in a V configuration, there are two pairs of heat pipes each forming a V with the V's nested one within the other and with the heat pipes submerged in the pool of molten metal so that a compartment of molten metal existing between the two V's provided the presence of the V configured pairs of heat pipes serve as dams or barriers to the flow of molten metal longitudinally or transversely past the heat pipes so that their effectiveness for transferring heat from a central upstream to a marginal downstream location is further enhanced by the diagonal flow that results.

Until now the heat pipes which have been described have been heat pipes having substantially linear configuration, although several of the embodiments already described could employ heat pipes of any other convenient configuration. Those embodiments of the invention and several more to be further described below can conveniently employ heat pipes having what shall be described as a closed loop configuration which in and of itself appears to be novel.

A linear configuration heat pipe is one essentially like those shown in the article by Lavoie mentioned above. The linear heat pipe has a single region at one extremity which is expected to be in a hot environment and serves as a single vaporizing end and another portion at or near its other extremity to be in a colder environment and serves as a single condensing end. The closed loop heat pipes envisioned by the present applicants are heat pipes having a continuous closed loop enclosure with no single locations intended or expected to act as vaporization locations and condensation locations, respectively. Rather, it is intended and expected with the closed loop heat pipes employed in certain particularly preferred embodiments of this invention that, due to their surrounding thermal environment, a plurality of vaporization and condensation locations will develop within the closed loop heat pipes. Adjacent condensation and vaporization locations would be coupled by the constraints of conservation of mass and energy so that a plurality of working fluid circulation cells develop throughout the enclosed space of each closed loop heat pipe. These closed loop heat pipes are provided with a wick throughout and with a space for the expansion and movement of vaporized working fluid throughout their enclosed lengths. The wick and the vapor space are in communication throughout the enclosed lengths of a closed loop heat pipe either continuously or at relatively closely spaced, discrete locations. In the event that the wick is an open-pore wick, the vapor space and the wick can be in communication substantially continuously throughout the length of the closed loop heat pipe. In the event that the wick comprises an annular space of capillary dimension between two impervious conduits coaxially mounted with respect to each other and with the inner conduit having its inner space serving at the vapor space of the heat pipe, a plurality of orifices are provided through the inner pipe to provide communication between the vapor space of the inner pipe within the capillary annular wick space of the combination with the orifices being located at discrete locations along the length of the inner pipe spaced at conveniently close locations.

The closed loop heat pipes employed in this invention may be any of a variety of convenient shapes with certain particular shapes being best suited for specific purposes at particular locations within a glass forming chamber. For example, the closed loop heat pipes may be circular, free form or substantially rectangular in shape. They may be any regular or irregular polygon in a particularly preferred embodiment; they are generally shaped as triangles. The cross-sectional shape of the conduit or chamber comprising the heat pipe may also be any convenient shape, although a circular shape is preferred for convenience of construction so that tubing or pipe or the like may be employed in fabrication of either the described closed loop heat pipes or the described substantially linear configuration heat pipes.

A closed loop heat pipe having a circular configuration may be found to be particularly useful in efficiently transferring heat from a central portion of the forming chamber to a portion of the forming chamber inboard or inwardly disposed of the extreme marginal edge region of an advancing layer of a sheet of glass.

This embodiment of the invention is useful for providing transfer of heat from the central portion of a sheet of glass to other portions of the glass spaced inwardly from its margins rather than providing full heat transfer to the extreme marginal edges of the sheet of glass. This may be accomplished either by using a single, circular closed loop heat pipe disposed in a forming chamber with the center of the circle located at or near the longitudinal centerline of the furnace or by employing a pair of circular closed loop heat pipes, each disposed with its center approximately halfway between the longitudinal centerline of the glass forming chamber and a longitudinal line defining the approximate location of an edge of an advancing layer or sheet of glass passing through the chamber.

Rectangular closed loop heat pipes may be used effectively to establish substantially uniform thermal conditions both transversely and longitudinally throughout a selected region of a forming chamber. Such heat pipes are disposed with two substantially parallel legs parallel to the longitudinal centerline of the forming chamber and two remaining substantially parallel legs disposed substantially normal to the longitudinal centerline of the furnace. When employing such heat pipes, either in complementary pairs disposed to each side of the centerline of the furnace or as a single heat pipe extending substantially across the full width of the furnace across the centerline of the furnace, heat is transferred through the heat pipe transversely along its upstream leg and longitudinally in a downstream direction toward its downstream leg, as well as outwardly transversely from the central portion of the furnace to the marginal portion of the furnace along its downstream leg. The net effect of using a rectangular closed loop heat pipe in this manner is that throughout the region embraced by the rectangular closed loop heat pipe uniform temperatures are provided and maintained. A plurality of such heat pipes may be disposed in a forming chamber, some being at a location downstream or farther along the path of glass advance from the others to further effectuate and take advantage of this principle of establishing a substantially uniform temperature over a discrete region within a forming chamber. When employing a plurality of such heat pipes disposed in a chamber in this fashion, there are established a plurality of discrete, temperature-controlled regions, each corresponding to the region occupied by one of the heat pipes over which more uniform thermal conditions are established and maintained.

As a further refinement and embodiment of this invention already described involving the positioning of substantially linear heat pipes in V configuration, complementary paired, triangular-shaped, closed loop heat pipes may be employed in a forming chamber. A single triangular-shaped, closed loop heat pipe may be employed with one corner of the triangle at or near the longitudinal centerline of the forming chamber and pointing in an upstream direction toward the entrance end of the forming chamber with the leg of the triangular-shaped, closed loop heat pipe opposite that corner being oriented normal or substantially normal to the longitudinal centerline of the furnace. Two complementary pairs of triangular-shaped heat pipes may be positioned on opposite sides of the centerline of a forming chamber so that, together, they provide a location between adjacent corners pointed in an upstream direction located near the longitudinal centerline of the furnace and with legs opposite such corners located normally or substantially normally to the centerline of the furnace at a location downstream from that corner location.

In the preferred embodiment of this invention involving the use of heat pipes in the vicinity of the entrance end of the forming chamber, a portion of a heat pipe extending beneath the surface of the pool of molten metal in the chamber is embedded in a guide which extends longitudinally along a marginal portion of the forming chamber for inhibiting the outward flow of freshly delivered molten glass and for directing the delivered layer or stream of molten glass along a path which extends its path of delivery from the glass melting and refining furnace. Such guides have an inherent tendency to cool in the absence of providing heat to them. While heat may be continued to be provided to the guides by the employment of radiant heaters above them or electrical heaters associated with the guides themselves, it is useful to withdraw heat from the central portion of the forming chamber immediately beneath the hot, freshly delivered layer of molten glass and transfer that heat by means of such heat pipes into the guides at the margins of the layer of glass. Each guide may be provided with either a linear or closed loop heat pipe which is partially embedded within the guide and partially extended outwardly from an inside face of the guide at an elevation such that it will be submerged in a pool of molten metal in the chamber and beneath a layer of molten glass advancing between the guides. By mounting the heat pipes in the guides in this fashion, it is possible to remove a guide and heat pipe for maintenance of either without providing additional devices for holding the heat pipes on the bottom of the forming chamber and preventing a buoyant rise into contact with the glass which is supported on the pool of molten metal. This is because the guides themselves serve as mountings for the heat pipes and the guides, even though buoyant, may be supported from above and held down in their appropriate position during operation.

In another particularly preferred embodiment of this invention wherein heat pipes, either linear or closed loop, are embedded or partially embedded in the bottom liner of a glass forming chamber, marginal portions of the heat pipes are embedded in the side wall or perimeter block portion of the chamber which extends upwardly from the bottom liner and, in some instances, extends above the upper surface of the pool of molten metal contained therein. Such an arrangement is particularly useful where it is desired to provide for a net removal of heat from the glass passing over the heat pipes and supported by the molten metal above them while avoiding the substantial removal of heat from the chamber which would be accomplished where the heat pipes extend outwardly through the enclosure of the chamber. This arrangement is considered to be one wherein the glass may be effectively and sufficiently cooled without removing heat from the forming chamber beyond that which must be inevitably lost due to the inherent heat loss through the walls of the chamber itself. This invention in its various aspects and embodiments may be further appreciated with reference to the drawings accompanying this description.

DESCRIPTION OF THE PREFERRED EMBODIMENTS

Figure 1:
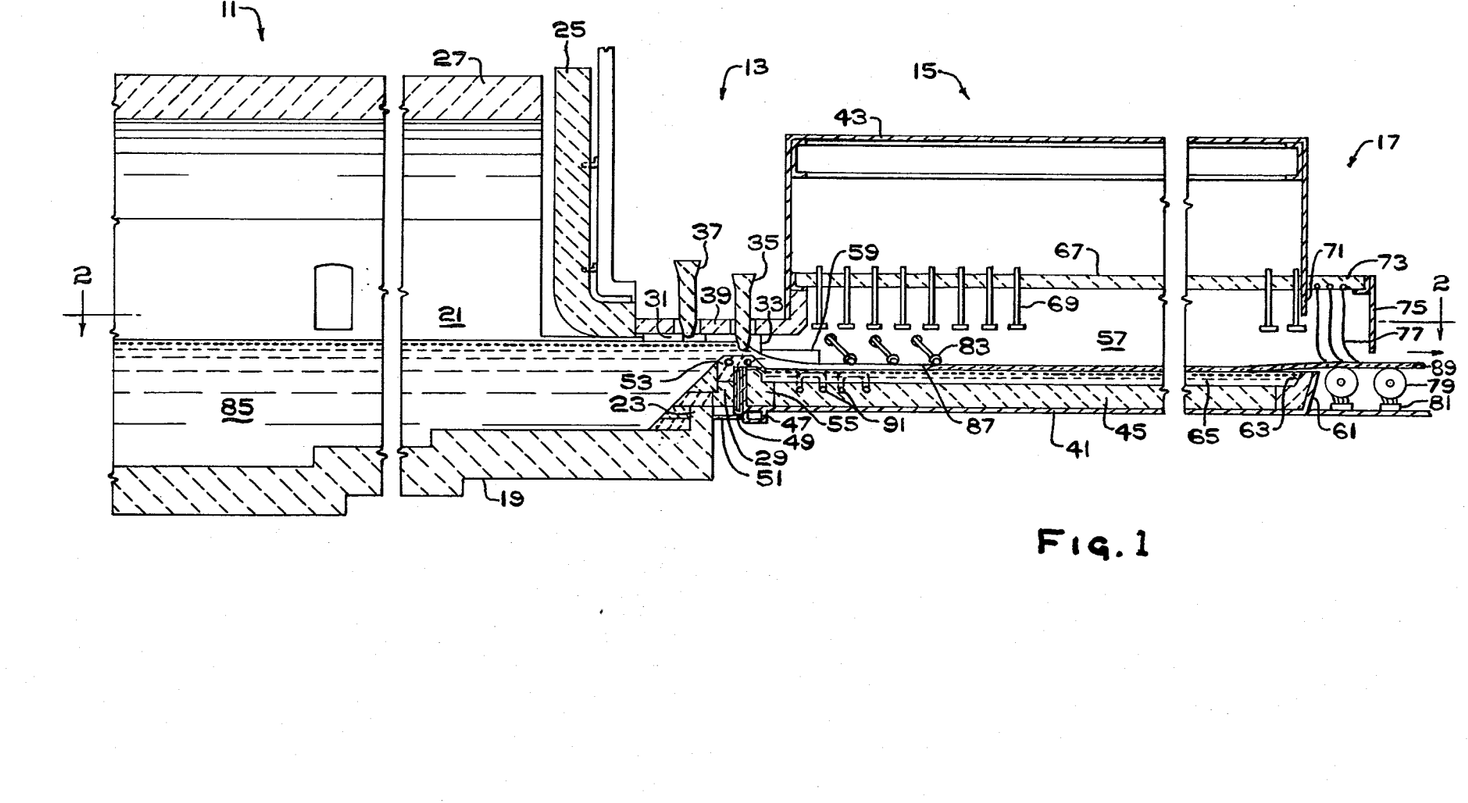
FIG. 1 is a longitudinal elevation in cross section of a glassmaking facility incorporating the heat pipes according to this invention inside its forming chamber.
Figure 2:
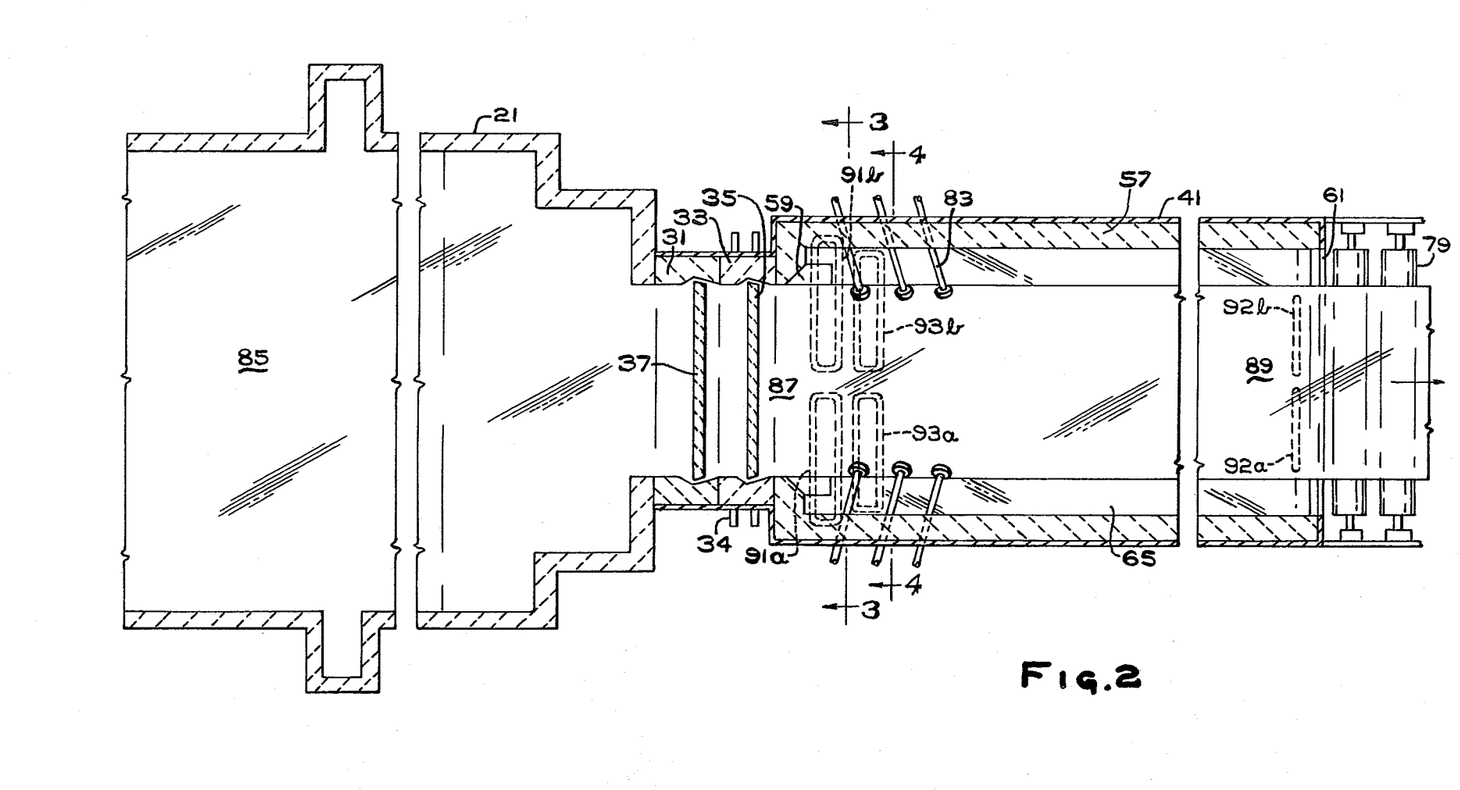
FIG. 2 is a longitudinal plan view of the glassmaking facility seen in FIG. 1 taken along section line 2—2 of FIG. 1.
Figure 3:
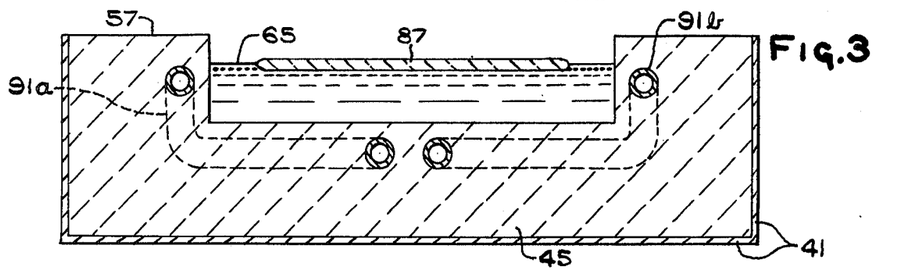
FIG. 3 is a partial transverse cross-sectional elevation of a selected portion of the glass forming chamber shown in FIGS. 1 and 2 taken along section line 3—3 of FIG. 2.
Figure 4:
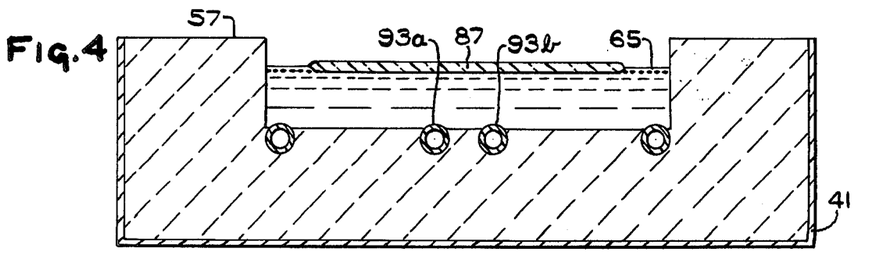
FIG. 4 is a partial transverse cross-sectional elevation of a selected portion of the glass forming chamber shown in FIGS. 1 and 2 taken along section outline 4—4 of FIG. 2 and illustrating an alternative or complementary embodiment of the heat pipe arrangement as illustrated in FIG. 3.

This invention and the context in which it is applied in combination with other elements and combinations comprising glassmaking facilities may be appreciated with reference first to FIGS. 1 through 4. Referring initially to FIGS. 1 and 2, there is illustrated a glassmaking facility comprising a glassmaking furnace or tank 11 connected through a molten glass delivery facility 13 to a flat glass forming chamber 15. At an exit end of the forming chamber 15, remote from the molten glass delivery facility 13, there is provided a separate glass lift-out assembly 17. During the making of glass, the process stream of glass through the apparatus is from left to right in FIGS. 1 and 2, which is from upstream locations to downstream locations through the facilities.

The glassmaking furnace or tank 11 includes a melter, not shown, for receiving raw batch materials and providing means for heating these materials to melt them and cause them to react and form a body of molten glass and a refiner or conditioner which comprises a downstream end of the glassmaking furnace 11 as illustrated. In the refiner or conditioner portion of the glassmaking furnace, the furnace comprises a bottom 19, side walls 21 and a front basin wall 23, which together form the end of a container for containing a pool of molten glass. The furnace 11 further comprises an upper front wall 25 and a crown or roof 27.

The delivery facility 13 includes a threshold assembly 29 for supporting molten glass during its discharge from the glassmaking furnace 11 and delivery to the glass forming chamber 15. The threshold assembly 29 also incidentally serves as an uppermost part of the front basin wall 23 and as inlet wall of the forming chamber 15. The delivery facility 13 further comprises side jambs 31 and 33 extending upwardly from the ends of the threshold assembly 29 which, together with the threshold assembly 29, provide a channel through which molten glass may be delivered. An operating metering member or tweel 35 is mounted on an adjustable mounting, not shown, external to the chamber and suspended downwardly in spaced relation to the threshold 29 between the jambs 33. This tweel 35 may be moved upwardly or downwardly to control the size of an opening defined by the tweel 35, the jambs 33 and the threshold assembly 29 so that the rate of molten glass delivery to the forming chamber is controlled. A backup tweel 37 is similarly mounted and is usually maintained in a position above molten glass in the delivery facility 13. In the event that the operating tweel 35 must be replaced or repaired, the backup tweel 37 may be used to either control the flow of glass or to shut off the glass flow entirely during such repairs or replacement. Extending over and forming the upper portion of the delivery facility 13 is a flat arch or roof 39.

The glass forming chamber 15 includes a bottom casing 41 which is essentially an open-topped steel box having a bottom and sides and a top casing 43 which is essentially an open bottom box having a top, sides and ends and also constructed of steel or the like. Inside the bottom casing 41 is a bottom liner 45 of refractory material. At the upstream or entrance end of the forming chamber 15 is a casing cooler 47 affixed to the bottom casing 41 and a vertical cooler 49 also affixed thereto. The vertical cooler 49 extends upwardly into the threshold assembly 29 and provides an end wall to the bottom casing 41. The casing is provided with a bottom casing seal 51 extending from the casing cooler 47 back into contact or into a seal connection with the front basin wall 23 of the glassmaking furnace 11.

The threshold assembly 29 includes a threshold block 53 having cooler pipes 54 or other stabilizing and mounting elements extending through it transverse to the glass path through the delivery facility 11. Below the threshold block 53 and supporting it is a threshold space block 55. The refractory elements of the threshold assembly 29 surround the vertical cooler 49 so that the threshold assembly 29, in combination with the vertical cooler 49, provides an end wall for the bottom portion of the forming chamber 15.

The forming chamber 15 further includes side walls 57 which include thicker, lower curbs or blocks 58 about the perimeter of the chamber. Refractory guides 59 are mounted in the chamber at its entrance end extending in a downstream direction from the jambs 33. These guides 59 provide means for initially restraining and holding a freshly delivered stream or layer of molten glass. The forming chamber further includes an exit lip casing 61 connected to the bottom casing 45 and a refractory exit lip 63 mounted inside the lip casing 61. The refractory exit lip 63 with its casing 61, the vertical cooler 49 in combination with a threshold assembly 29, the bottom liner 45 in combination with the bottom of the bottom casing 41 and the side walls 57 (including perimeter block portion 58) together form an open-topped container for containing a pool of molten metal. The glass forming chamber 15, when prepared for operation, includes a pool of molten metal 65 in this bottom container portion of the chamber. The metal 65 is preferably tin or an alloy of tin suitable for supporting glass while cooling it and stretching it to form a sheet or ribbon of glass.

Above the pool of molten metal 65 is a headspace defined by the side walls 57 and a ceiling or roof 67. A plurality of heaters, preferably electric heaters, 69 are mounted in the chamber 15 along the roof or ceiling 67. The chamber is provided with an upper end casing 71 which separates it from the glass lift-out facility 17.

The glass lift-out facility 17 includes an exit canopy 73 mounted downstream of the upper casing 43 and having an exit canopy wall 75 extending downwardly and transversely across the intended path of glass movement. Mounted within the exit canopy 73 are one more drapes 77 for sealing the headspace of the forming chamber. Beneath the exit canopy 73 in a structure located just downstream of the forming chamber 15 are exit rolls 79 for lifting and conveying a continuous sheet or ribbon of glass from the forming chamber. The exit rolls are preferably provided with seals 81.

Referring now to the forming chamber itself, a plurality of top edge rolls 83 may be provided in the forming chamber for applying tractive and stretching forces to an advancing layer of glass as it passes through the forming chamber.

During operation, a pool of molten glass 85 is maintained in the glassmaking furnace 11 and, from the upper portion of the pool of molten glass 85, there is discharged a stream or layer of molten glass 87 over the threshold assembly 29, beneath the operating tweel 35 and between the jambs 33 onto the pool of molten metal 65 in the forming chamber. Once delivered, the layer of glass 87 is advanced along the surface of the pool of molten metal 65 in a downstream direction (that is, toward the right in FIGS. 1 and 2). Marginal portions are initially engaged by the top edge rolls 83 to urge the glass outwardly to maintain its width and to advance it along the surface of the pool of molten metal. As the glass is advanced, it is gradually cooled to form a dimensionally stable, continuous sheet or ribbon of glass with the desired width and thickness. It is thereafter lifted from and conveyed from the pool of molten metal in the forming chamber and carried forward to an annealing lehr or other further processing in order to make useful flat glass articles, such as windows, mirrors and the like.

Closed loop heat pipes 91a and 91b are mounted in the forming chamber near its entrance end where molten glass is delivered to the chamber. These heat pipes are embedded in the refractory liner bottom 45 and side walls 57 of the chamber. As a layer of glass 87 passes over the heat pipes 91a and 91b, heat is transferred from the glass, particularly along its central portion, through the molten metal 65 supporting the glass and to the inside, longitudinal legs of the two heat pipes. This causes the working fluid in the inside, longitudinal legs of the heat pipes to vaporize and expand and to flow along the transverse or lateral legs of the heat pipe to its outer, longitudinal leg where the vapor condenses, giving up heat to the molten metal and then to the glass in the marginal regions of the forming chamber near and at its side walls. By removing heat from a central portion of the freshly delivered layer of molten glass and transferring it to the marginal portions of the layer of glass, the viscosity of the glass throughout its width is made more uniform. As a consequence, the velocity of flow or advance of the glass throughout the width of the layer is made sufficiently uniform to avoid the development of offensive, optical distortion patterns in the glass.

A pair of substantially linear heat pipes 92a and 92b are mounted or positioned in the forming chamber near its exit end from which a finished, continuous sheet or ribbon is withdrawn following its formation. These heat pipes are illustrated as pipes resting on the bottom liner 45 of the chamber and submerged in the pool of molten metal 65. They are each extended laterally or transversely across about half of the width of the chamber. During operation, as a continuous sheet of glass passes over the heat pipes 92a and 92b, heat is removed preferentially from the central portion of the sheet and transferred to the marginal portions of the sheet and to the molten metal beneath them. The use of heat pipes in this region of the forming chamber assists in making the temperature of the glass uniform throughout immediately prior to its being lifted and removed from the molten metal. As a result, the likelihood of exit end breaks is diminished since any cooling which is accomplished is spread over the whole sheet of glass so that localized extra cold spots are avoided.

In order to control glass temperatures longitudinally along the path of glass advance as well as laterally across its width, a second set or pair of heat pipes 93a and 93b are positioned in the forming chamber in a region immediately downstream from the region of heat pipes 91a and 91b. These heat pipes are only partially embedded in the bottom liner 45 in the embodiment illustrated in FIG. 4. This configuration is effective for increased heat transfer rates between the molten metal and the heat pipes as the thermal insulating effect of a covering layer of refractory is eliminated.

Figure 5:
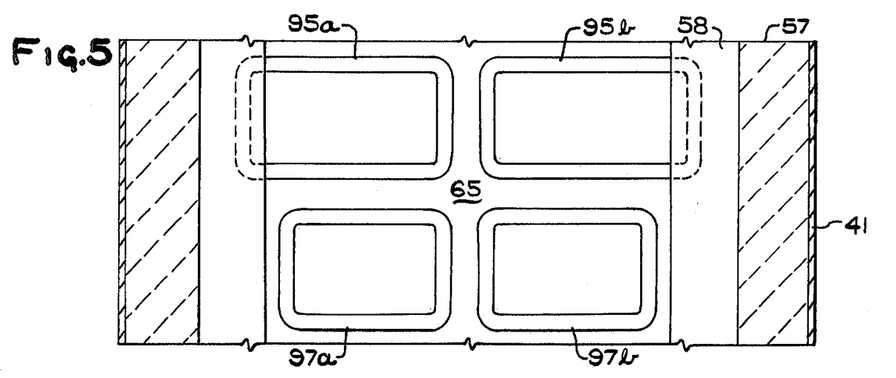
FIG. 5 is a partial plan view of a portion of a glass forming chamber illustrating an embodiment of the invention having substantially rectangular closed loop heat pipes disposed in transverse and longitudinal relation to one another with a portion of some of the heat pipes embedded in the perimeter at walls of the forming chamber.
Figure 6:
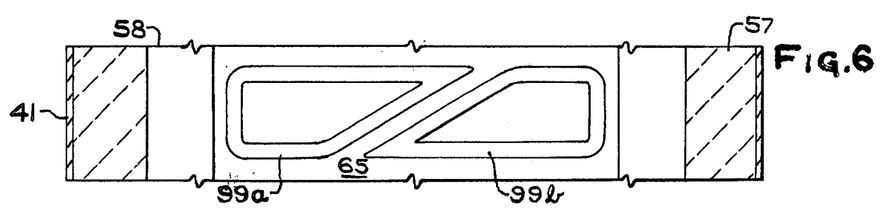
FIG. 6 is a partial plan view of a portion of a glass forming chamber illustrating the use of closed loop heat exchangers having polygon shapes skewed and extending past one another approximately at the longitudinal centerline of a glass forming chamber.
Figure 7:
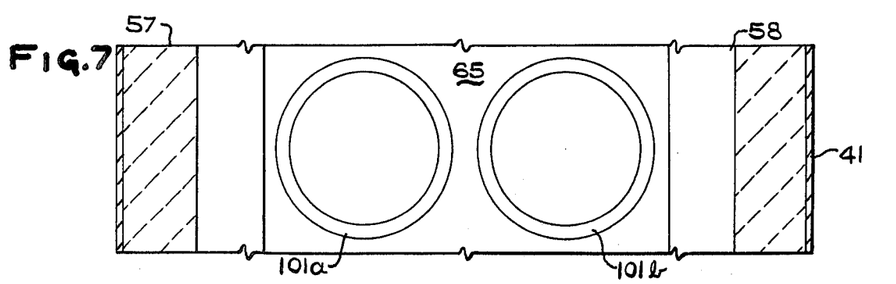
FIG. 7 is a partial plan view of a portion of a glass forming chamber illustrating an embodiment in the invention employing circular closed loop heat pipes.

The closed loop heat pipes according to this invention may be any of several useful shapes. Three heat pipe shapes and configurations are illustrated in FIGS. 5, 6 and 7. In all of these drawings the overlying glass is removed for clarity.

Two pairs of rectangular closed loop heat pipes 95a and 95b and 97a and 97b are positioned in a rectilinear array in the bottom of a forming chamber as shown in FIG. 5. This arrangement is essentially the same as that illustrated in FIGS. 1, 2, 3 and 4, but the enlarged view of FIG. 5 makes clearer the interrelationship of these heat pipes. Four regions of temperature uniformity are established, each region corresponding to the area embraced by a heat pipe. In viewing the drawing, the lower, left and lower, right corners of the regions receive heat from the upper, center corners of each region when glass passes over the heat pipes in a direction from top to bottom (in a downstream direction).

The embodiment of the invention shown in FIG. 6 is designed to avoid the possibility of any fixed hot point over which glass could pass with a resulting line in the glass having been exposed to such a unique point. Each heat pipe 99a and 99b of the pair has a skewed leg, and the skewed legs are lapped past one another across the longitudinal axis or centerline of the chamber.

Circular closed loop heat pipes are believed to have a superior ability to reverse internally and to respond quickly to imposed thermal changes in localized portions of their surroundings. Because the vapor flow resistance and liquid capillary flow resistance are uniform throughout the length of a circular closed loop heat pipe the direction and rate of gas and liquid flow through the pipe can be varied virtually instantaneously. In FIG. 7 two circular heat pipes 101a and 101b are disposed in the side regions of a forming chamber. In another embodiment, a circular heat pipe may be located along the centerline or longitudinal axis of a forming chamber.

Figure 8:
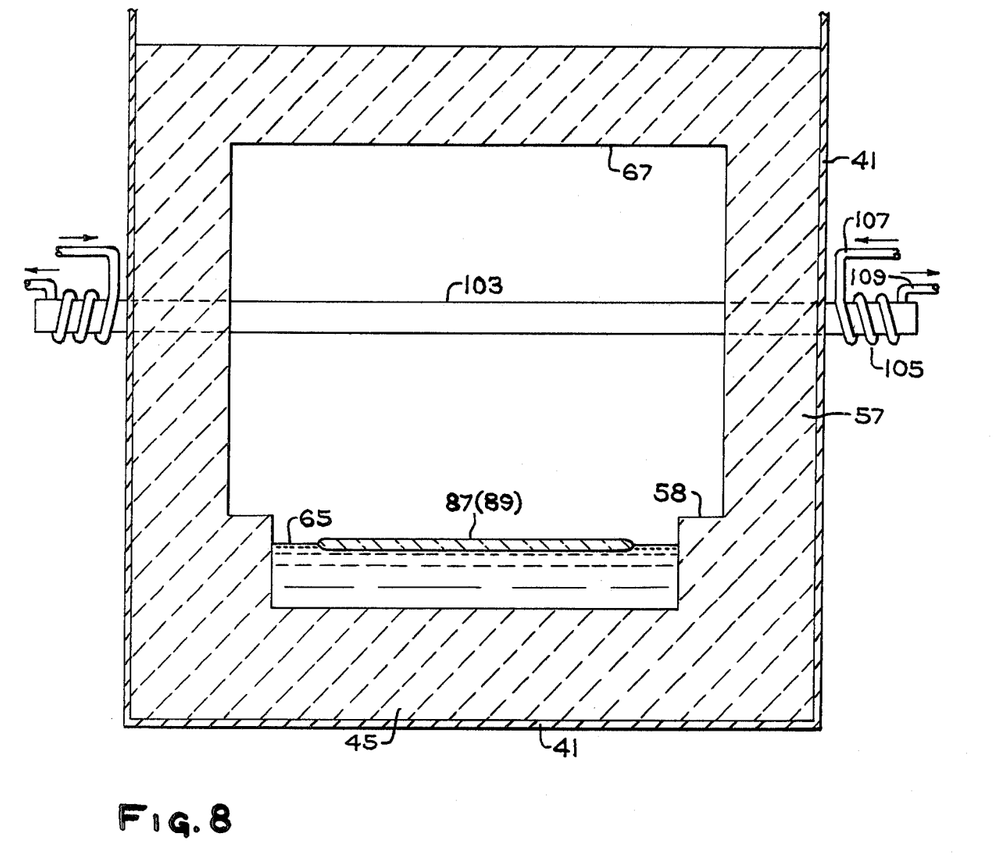
FIG. 8 is a lateral or transverse cross-sectional elevation of a glass forming chamber illustrating an embodiment of the invention in which a transverse heat pipe is extended across the headspace of a forming chamber.

In the embodiments of the invention already described with reference to the drawings, the heat pipes are wholly inside forming chambers but as will now be described, heat pipes can be effectively employed to assist in the net transfer of heat from or to a forming chamber by providing an exposed heat pipe portion external to the chamber. As seen in FIG. 8, a heat pipe 103 extends laterally or transversely across the headspace of a forming chamber and outwardly through its side walls 57 and casing 41. The heat pipe may be either in the entrance region of the chamber above a layer of molten glass 87 or near the exit end of the chamber above a sheet or ribbon of glass 89. Also, heat pipes may be located at any other convenient location along the length of the chamber or at a plurality of locations. Since heat transfer between the glass and the heat pipe 103 is primarily by thermal radiation, the heat pipe 103 may be coated with a heat-absorbing/emitting coating to enhance its effectiveness.

The ends of the heat pipe 103 extend outwardly from the chamber enclosure and are exposed for cooling them. A cooling coil 105 surrounds an exposed end of the heat pipe, and the coil 105 is provided with an inlet conduit 107 and an outlet conduit 109. During use, a coolant, such as water, is directed through the coil 105 to remove heat from the exposed end of the heat pipe. The working fluid in the heat pipe 103 is vaporized at some location near the center of the pipe and flows to its exposed ends. There the vapors are condensed giving up heat to the coils 105, and the condensed liquid is caused to flow through the internal wick of the heat pipe to its central location where vaporization occurs.

Heat pipes of the kind already described with reference to FIG. 8 may be positioned inside the upper part of the casing in the service space above the ceiling 67 of a forming chamber to cool the electrical equipment commonly found therein. It further appears possible to employ a heat pipe as a bus bar for supplying electric power to the heaters in a forming chamber. In this use a heat pipe having a stainless steel or aluminum shell may be used. Common organic working fluids could be used in this environment.

Figure 9:
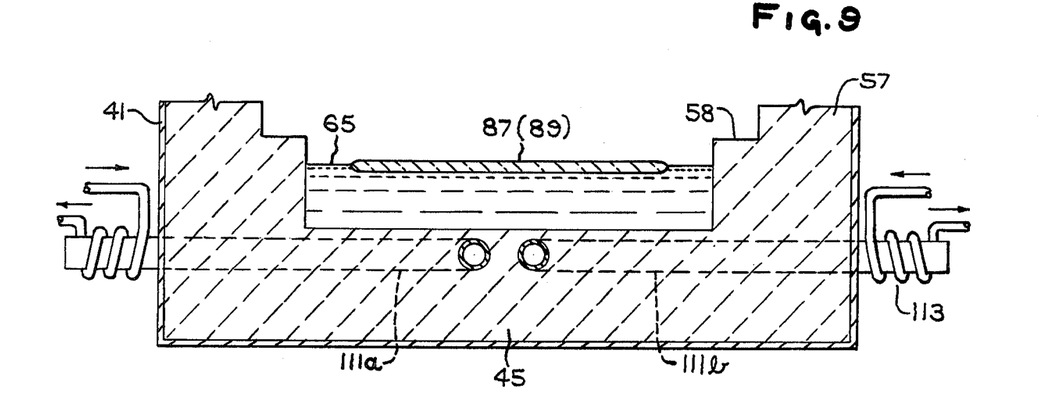
FIG. 9 is a partial lateral or transverse cross-sectional elevation of a glass forming chamber illustrating an embodiment of the invention in which a portion of each heat pipe employed extends outwardly through the enclosure or casing of the forming chamber and is provided with means for removing heat from the heat pipe.

In FIG. 9 there are illustrated two L-shaped heat pipes 111a and 111b embedded in the bottom liner 45 of a forming chamber. Each L-shaped heat pipe has a leg oriented longitudinally along the chamber near its longitudinal axis and a leg oriented laterally or transversely across a part of the chamber, through its side walls (58 and 57) and through its casing 41 to provide an exposed end for cooling. The exposed end is provided with a cooling coil 113 which is employed in the manner of the cooling coil 105. As illustrated, the heat pipes 111a and 111b may be located at any location along the length of a forming chamber from a location beneath a freshly-delivered layer of molten glass 87 to a location beneath a dimensionally stable, continuous sheet of glass 89.

While cooling coils 105 and 113 have been illustrated and described for use with heat pipes, it is also possible to employ heaters in conjunction with heat pipes to heat their exposed ends to, thus, heat glass inside a chamber.

Figure 10:
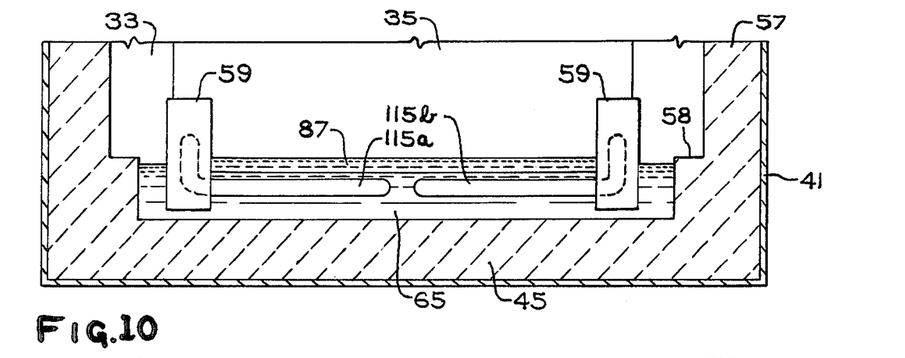
FIG. 10 is a partial lateral or transverse cross-sectional elevation of a forming chamber illustrating an embodiment of the invention in which heat pipes are partially embedded in guide blocks at the entrance end of a glass forming chamber.

The embodiment of the invention shown in FIG. 10 is one designed to distribute heat throughout a freshly delivered layer of molten glass immediately following its delivery and while it remains restrained between guides or restraining members 59. A heat pipe is mounted between the guides 59 at an elevation for submergence in the molten metal 65. A single pipe may be used with one end in each guide 59 or a pair of pipes 115a and 115b may be used. When using a pair of heat pipes, each is partially mounted in a guide with a portion extending inwardly of the chamber sides from the inside face of the guide. As glass passes over the heat pipes heat from the central portion of the glass is transferred to its marginal portions through the heat pipes and the guides.

Figure 11:
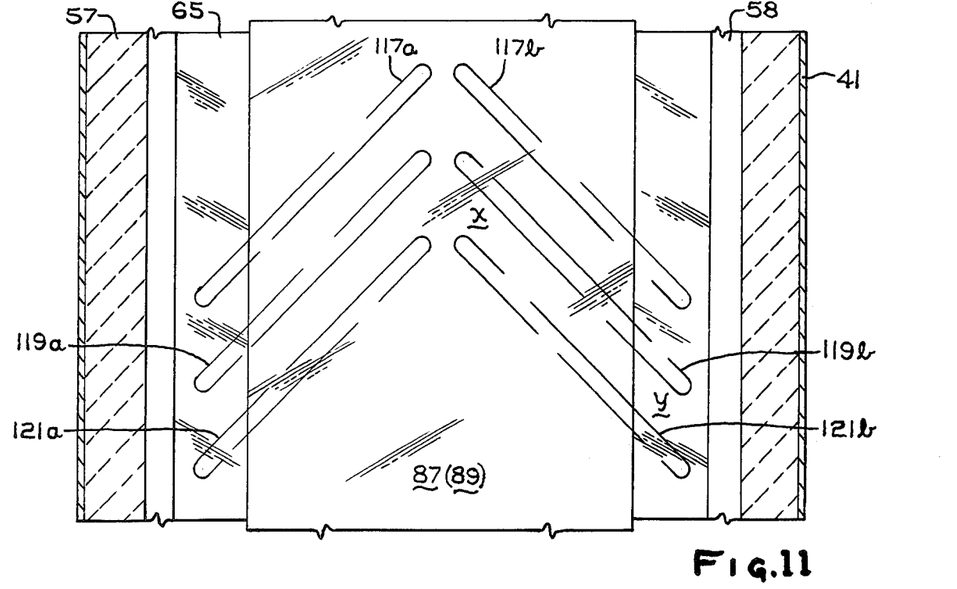
FIG. 11 is a partial plan view of a portion of a glass forming chamber illustrating an embodiment of the invention employing a plurality of substantially linear heat pipes submerged in a pool of molten metal in a chamber and arranged in a nested V arrangement for distributing heat from central regions of the forming chamber to a marginal region of the forming chamber located at different locations along the length of the chamber from those from which heat had been distributed.
Figure 12:
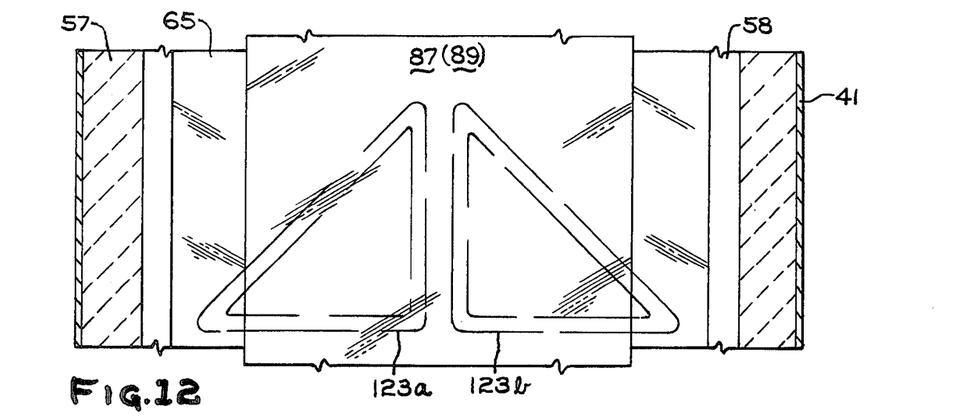
FIG. 12 is a partial plan view of a portion of a glass forming chamber illustrating an embodiment of the invention employing triangular shaped, closed loop heat pipes for distributing heat both longitudinally and transversely within a forming chamber.

Embodiments of the invention designed to influence and modify the convective flow of molten metal are shown in FIGS. 11 and 12. In these embodiments the heat pipes are submerged in the glass-supporting pool of molten metal 65 so that they act, not only as heat pipes, but also as flow barriers or dams.

A plurality of V-shaped pairs of heat pipes are mested together in the arrangement shown in FIG. 11. The heat pipes of each pair are, respectively, 117a and 117b, 119a and 119b, and 121a and 121b. With the glass (87 or 89 depending upon the location in the chamber) advancing in the direction shown by the arrow, hotter and fresher central glass (as near $x$) gives up heat to colder and older marginal glass (as near $y$). The heat pipes, because of their angular orientation operate over a greater imposed temperature difference than heat pipes that are laterally oriented only. Also, convective flow of molten metal is established between locations x and y as the heat pipes act as barriers to longitudinal flow. This further enchances the rate of heat transfer to the margins of glass.

In FIG. 12 there are shown triangular-shaped, closed loop heat pipes 123a and 123b. Each heat pipe has a corner positioned close to the centerline or axis of the chamber at an upstream location as the glass advances in the direction of the arrow. Each heat pipe has a leg (the legs with the lead lines at the bottom of FIG. 12) that is oriented laterally or transversely across the chamber. These heat pipes serve in a manner similar to those of FIG. 11 but, being closed loop heat pipes, are more readily adaptable to random localized variations in temperature.

While this invention has been described with reference to particularly preferred embodiments thereof, those skilled in the art will, with the aid of this disclosure, appreciate other embodiments within the scope of the applicants's claims or equivalent thereto.

We claim:

1. In a glass forming chamber comprising an elongated enclosure containing a pool of molten metal extending lengthwise of the enclosure for supporting glass, said pool of molten metal comprising a longitudinally extending centrally disposed high temperature region and adjacent longitudinally extending edge regions of lower temperatures which produce temperature differences in a direction transverse to the longitudinal axis of the chamber, means for delivering a layer of molten glass onto the pool of molten metal, means for advancing the glass along the surface of the pool of molten metal, means for cooling and applying forces to the advancing glass to make a continuous sheet of glass and means for removing a continuous sheet of glass from the chamber, the improvement which comprises a heat pipe disposed in heat transfer relationship with said pool of molten metal, said heat pipe comprising a sealed conduit having therein a vapor space, a condensable working fluid space and a wick member extending between said spaces, at least one portion of said conduit in which said condensable working fluid space is located being in heat transfer relation to a high temperature region of said pool of molten metal and at least one portion of said conduit in which said vapor space is located being in heat transfer relation to a low temperature region of said pool of molten metal, whereby the temperatures in said pool of molten metal in a direction transverse to a longitudinal axis of said chamber and along which said heat pipe is located are maintained more uniform.

2. The apparatus according to claim 1 wherein said heat pipe is at least partially embedded in a refractory liner of the chamber enclosure and in heat transfer relation to said pool of molten metal through said refractory liner.

3. The apparatus according to claim 1 wherein said pipes are at least partially submerged in the pool of molten metal contained in the forming chamber.

4. The apparatus according to claim 1 wherein said heat pipe extends at least partially through a wall of said chamber enclosure and means are provided for extracting heat from a portion of the heat pipe extending outside of the enclosure and substantially adjacent the portion of said heat pipe which is in heat transfer relation to said low temperature region of said pool of molten metal.

5. The apparatus according to claim 1 wherein said heat pipe is mounted across a headspace of the forming chamber and spaced between a roof of the chamber and the pool of molten metal contained therein to face the portions of said pool of molten metal with which it is in heat transfer relation.

6. The apparatus according to claim 1 wherein said heat pipe is positioned in a region of the forming chamber located substantially adjacent a location for removing a continuous sheet of glass therefrom.

7. The apparatus according to claim 1 wherein said heat pipe is positioned in a region of the forming chamber substantially adjacent a location for delivering a layer of molten glass thereto.

8. The apparatus according to claim 7 wherein the ends of said heat pipe adjacent its portions in heat transfer relation to said low temperature regions are each partially embedded in a refractory glass restraining member which extends longitudinally along a marginal portion of the forming chamber.

9. The apparatus according to claim 1 wherein said heat pipe is a closed loop heat pipe.

10. The apparatus according to claim 9 wherein said closed loop heat pipe is in the form of a circular closed loop.

11. The apparatus according to claim 10 wherein said circular closed loop heat pipe is located within the forming chamber with its center along the longitudinal axis of the chamber.

12. The apparatus according to claim 9 wherein a pair of said closed loop heat pipes are located in side-by-side relation to either side of the longitudinal axis of the chamber.

13. The apparatus according to claim 9 wherein said closed loop heat pipe comprises a substantially rectangular closed loop.

14. The apparatus according to claim 9 wherein said closed loop heat pipe is substantially a triangular-shaped closed loop and a said triangular-shaped closed loop heat pipe is positioned within said forming chamber to provide a leg of the triangle substantially normal to the longitudinal axis of the forming chamber and a corner located adjacent or substantially along the longitudinal axis of the forming chamber as its portion in heat transfer relation to said high temperature region of said pool of molten metal.

15. The apparatus according to claim 14 wherein a pair of triangular closed loop heat pipes are provided in complementary relation and located to each side of the longitudinal axis of the forming chamber.

16. The apparatus according to claim 1 wherein a plurality of heat pipes are disposed in regions displaced from one another along the length of the forming chamber.

17. The apparatus according to claim 1 wherein two heat pipes of a pair of heat pipes are positioned in complementary relation in said chamber, each heat pipe of said pair extending across a substantial portion of said chamber located to one side of its longitudinal axis.

18. The apparatus according to claim 17 wherein each of said heat pipes extends across a region of the forming chamber confined between a side wall of the forming chamber and the longitudinal axis of the forming chamber.

19. The apparatus according to claim 17 wherein said heat pipe is at least partially embedded in a refractory liner of the chamber enclosure and in heat transfer relation to said pool of molten metal through said refractory liner.

20. The apparatus according to claim 17 wherein each of said heat pipes is at least partially submerged in the pool of molten metal contained in the forming chamber.

21. The apparatus according to claim 17 wherein each of said heat pipes extends at least partially through a wall of said chamber enclosure and means are provided for extracting heat from a portion of the heat pipe extending outside of the enclosure and substantially adjacent the portion of said heat pipe which is in heat transfer relation to said low temperature region of said pool of molten metal.

22. The apparatus according to claim 17 wherein said heat pipes are positioned in a region of the forming chamber located substantially adjacent a location for removing a continuous sheet of glass therefrom.

23. The apparatus according to claim 17 wherein said heat pipes are positioned in a region of the forming chamber substantially adjacent a location for delivering a layer of molten glass thereto.

24. The apparatus according to claim 17 wherein the heat pipes of the complementary pairs of heat pipes are arranged in V orientation within said forming chamber.

25. The apparatus according to claim 24 wherein the heat pipes of said V oriented complementary pair of heat pipes are positioned with the apex of said V pointing in the direction of the means for delivering the layer of molten glass onto the pool of molten metal and being adjacent the portions of said heat pipes which are in heat transfer relation to said high temperature region of said pool of molten metal.

26. The apparatus according to claim 25 wherein said V oriented complementary heat pipes are submerged in the pool of molten metal with the apex of the V located substantially along the longitudinal axis of the chamber.

27. The apparatus according to claim 24 wherein a plurality of V oriented pairs of heat pipes are located in the forming chamber in nested relation to one another.

28. The apparatus according to claim 27 wherein each of said heat pipes is a closed loop heat pipe.

29. The apparatus according to claim 28 wherein said closed loop heat pipe is in the form of a circular closed loop.

30. The apparatus according to claim 27 wherein said closed loop heat pipes are located in side by side relation to either side of the longitudinal axis of the chamber.

31. The apparatus according to claim 27 wherein each of said closed loop heat pipes comprises a substantially rectangular closed loop.

32. The apparatus according to claim 27 wherein each of said pair of complementary paired heat pipes has its portion in heat transfer relation to said low temperature region of said pool of molten metal at least partially embedded in a refractory glass restraining guide member which extends longitudinally along a marginal portion of the forming chamber in the vicinity of the location at which the glass is delivered to the forming chamber.

33. The apparatus according to claim 27 wherein a portion of each of said heat pipes in heat transfer relation to said low temperature region of said pool of molten metal is embedded in a side wall portion of a refractory liner within the enclosure of the forming chamber.

34. The apparatus according to claim 27 wherein said closed loop heat pipe is substantially a triangular-shaped closed loop and a said triangular-shaped closed loop heat pipe is positioned within said forming chamber to provide a leg of the triangle substantially normal to the longitudinal axis of the forming chamber and a corner located adjacent or substantially along the longitudinal axis of the forming chamber as its portion in heat transfer relation to said high temperature region of said pool of molten metal.

35. The apparatus according to claim 34 wherein a pair of triangular closed loop heat pipes are provided in complementary relation and located to each side of the longitudinal axis of the forming chamber.

36. The apparatus according to claim 27 wherein a plurality of heat pipes are disposed in regions displaced from one another along the length of the forming chamber.

37. In a method of manufacturing glass wherein a layer of molten metal in an enclosed forming chamber and the delivered glass is advanced along the surface of the pool of molten metal and is cooled and subjected to forces while advancing to form a continuous dimensionally stable sheet of glass, the improvement which comprises transferring heat from relatively hotter portions of the advancing glass to relatively colder portions of the advancing glass by disposing at least one heat pipe in the forming chamber such that the heat pipe, comprising a sealed conduit having therein a vapor space, a condensable working fluid space and a wick member extending between the spaces, has at least one first portion of said conduit in which the condensable working fluid space located in heat transfer relation to a high temperature region of the forming chamber adjacent such relatively hotter portions of the advancing glass and has at least one second portion of said conduit in which the vapor space located in heat transfer relation to a low temperature region of the forming chamber adjacent such relatively colder portions of the advancing glass and vaporizing a working fluid at said first portion of heat pipe adjacent such relatively hotter portions, conveying the vaporized working fluid through the heat pipe to said second portion of the heat pipe adjacent such relatively colder portions, condensing the conveyed vaporized working fluid at such second portion of the heat pipe and conveying the condensed working fluid through the heat pipe back to such first portion of the heat pipe.

* * * * *